US00RE47187E

(19) United States
(12) Reissued Patent
Harrison

(10) Patent Number: US RE47,187 E
(45) Date of Reissued Patent: Jan. 1, 2019

(54) PROJECTILE BODY AND CORRESPONDING AMMUNITION ROUND FOR SMALL ARMS OR A LIGHT FIREARM

(71) Applicant: TECHVENTURE INVESTMENTS PTY LTD, The Vines, Western Australia (AU)

(72) Inventor: Dale Harrison, Quinns Rocks (AU)

(73) Assignee: Techventure Investments Pty Ltd, Western Australia (AU)

(21) Appl. No.: 15/425,458

(22) Filed: Feb. 6, 2017

Related U.S. Patent Documents

Reissue of:
(64) Patent No.: 9,429,406
Issued: Aug. 30, 2016
Appl. No.: 14/422,451
PCT Filed: Jul. 25, 2014
PCT No.: PCT/AU2014/000756
§ 371 (c)(1),
(2) Date: Feb. 19, 2015
PCT Pub. No.: WO2015/013742
PCT Pub. Date: Feb. 5, 2015

(30) Foreign Application Priority Data

Jul. 31, 2013 (AU) ..... 2013902843
Oct. 15, 2013 (AU) ..... 2013101363

(51) Int. Cl.
*F42B 5/10* (2006.01)
*F42B 14/02* (2006.01)
(Continued)

(52) U.S. Cl.
CPC ..... *F42B 14/00* (2013.01); *F42B 5/10* (2013.01); *F42B 10/38* (2013.01); *F42B 10/44* (2013.01);
(Continued)

(58) Field of Classification Search
CPC .. F42B 14/02; F42B 10/44; F42B 5/10; F42B 10/38; F42B 12/02; F42B 14/00; F42B 5/18; F42B 10/32; F42C 19/0823
See application file for complete search history.

(56) References Cited

U.S. PATENT DOCUMENTS 695,809 A * 3/1902 Hawk ..... F42B 5/18 102/431
1,191,357 A * 7/1916 Snyder ..... F42B 15/00 102/376
(Continued)

FOREIGN PATENT DOCUMENTS

DE 1280095 10/1968
EP 0238155 9/1987
(Continued)

OTHER PUBLICATIONS

English Translation of Taiwan Patent Office Action for Application No. 094110459 dated Mar. 28, 2011 (11 pages).
(Continued)

*Primary Examiner* — Jeffrey R Jastrzab
(74) *Attorney, Agent, or Firm* — Michael Best & Friedrich LLP

(57) ABSTRACT

A projectile (14) for an ammunition round (10) for use with a small arms or light firearm comprises an elongated projectile body (16). The projectile body (16) has first and second axially opposed ends (18, 20) respectively and a cavity (20) extending there between. The cavity is able to hold a quantity of propellant (24). A plurality of seals (26) extend about an outer surface of the body (16). The seals (26) protrude radially from the body (16) and operate to form a substantial seal against an inner circumferential surface of a barrel (12) of the firearm. Two of the seals (26b and 26c) are mutually adjacent and spaced apart in a direction of a longitudinal axis of the body to form a seal
(Continued)

bound outer surface portion (36) of the body (16). One or more holes (38) are formed in the body (16) enabling fluid communication between the cavity (22) and the seal bound outer surface portion (36) of the body (16). This enables pressure equalization inside and outside of the cavity (22) about the seal bound outer surface portion (36) when the projectile (14) is travelling through the barrel (12).

23 Claims, 9 Drawing Sheets

(51) Int. Cl.

| | |
|---|---|
| ***F42B 14/00*** | (2006.01) |
| ***F42B 10/44*** | (2006.01) |
| ***F42B 10/38*** | (2006.01) |
| ***F42B 12/02*** | (2006.01) |
| ***F42C 19/08*** | (2006.01) |
| *F42B 5/18* | (2006.01) |
| *F42B 10/32* | (2006.01) |

(52) U.S. Cl.
CPC ..... *F42B 12/02* (2013.01); *F42B 14/02* (2013.01); *F42C 19/0823* (2013.01); *F42B 5/18* (2013.01); *F42B 10/32* (2013.01)

(56) References Cited

U.S. PATENT DOCUMENTS

| | | | | | |
|---|---|---|---|---|---|
| 2,110,264 | A | | 3/1938 | Gerlich | |
| 2,307,369 | A | | 1/1943 | Ferrel | |
| 2,407,264 | A | * | 9/1946 | Ferrel | F42B 5/10 102/204 |
| 2,408,252 | A | * | 9/1946 | De Ganahl | F42B 15/00 102/376 |
| 2,424,934 | A | * | 7/1947 | Kasper | F42B 15/00 102/376 |
| 2,507,878 | A | | 5/1950 | Banning, Jr. | F41A 1/00 102/517 |
| 2,793,592 | A | * | 5/1957 | Kroeger | F42B 14/02 244/3.23 |
| 3,349,708 | A | * | 10/1967 | Paget | F02K 9/32 102/374 |
| 3,361,066 | A | | 1/1968 | Gawlick et al. | |
| 3,815,503 | A | * | 6/1974 | Infantino | F42B 15/00 102/374 |
| 3,999,486 | A | | 12/1976 | Bower | |
| 4,712,465 | A | | 12/1987 | Macdonald | |
| 5,363,769 | A | | 11/1994 | Bellak et al. | |
| 6,234,058 | B1 | | 5/2001 | Morgado | |
| 7,921,780 | B2 | | 4/2011 | Harrison | |
| 8,474,380 | B2 | | 7/2013 | Harrison | |
| 2003/0145757 | A1 | | 8/2003 | Fischer et al. | |
| 2009/0145320 | A1 | | 6/2009 | Harrison | |

FOREIGN PATENT DOCUMENTS

| | | | | | |
|---|---|---|---|---|---|
| GB | 824759 | A | * | 12/1959 | F42B 5/02 |
| GB | 1317460 | A | * | 5/1973 | F42B 5/10 |
| GB | 2106618 | | | 4/1983 | |
| JP | H11513474 | | | 11/1999 | |
| JP | 2003130599 | | | 5/2003 | |
| JP | 2005016923 | | | 1/2005 | |
| WO | 0233343 | | | 4/2002 | |
| WO | 2005095884 | | | 10/2005 | |
| WO | 2008119115 | | | 10/2008 | |

OTHER PUBLICATIONS

European Search Report for Application No. 14175363.2 dated Oct. 15, 2014 (8 pages).
European Search Report for Application No. 14831444.6 dated Jun. 16, 2016 (10 pages).
Korean Office Action for Application No. 10-2006-7022586 dated Feb. 20, 2012 with English Translation (11 pages).
Viswanath et al., "Effectiveness of passive devices for axisymmetric base drag reduction at Mach 2", Journal of Spacecraft and Rockets, vol. 27, No. 3 (1990), pp. 234-237.
The CoreTech Projectile System for Light to Medium Arms Ammunition. Dated Nov. 2017.
International Search Report for PCT/AU2014/000756 dated Sep. 9, 2014 (6 pages).
Written Opinion for PCT/AU2014/000756 dated Sep. 9, 2014 (3 pages).

* cited by examiner

PROJECTILE BODY AND CORRESPONDING AMMUNITION ROUND FOR SMALL ARMS OR A LIGHT FIREARM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This document discloses a projectile body and corresponding ammunition round for small arms or a light firearm. To provide context, the term "small arms" is intended to denote firearms used by an individual including for example pistols, rifles, submachine guns, assault rifles and light machine guns; while the term "light firearm" is intended to denote a "firearm" designed for use by two or more persons serving as a crew and may include heavy machine guns, and anti-aircraft guns all being less than about 100 mm in calibre.

BACKGROUND ART

A round of ammunition for small arms or a light firearm typically comprises a case and a projectile. The case has one end which is crimped onto the projectile. An opposite end of the case is formed with a planar base wall that seats a primer. A volume of propellant is held within the cartridge between the projectile and an inside of the planar base wall. When the ammunition round is used, the primer is initiated usually mechanically by striking with a firing pin. This in turn causes deflagration of the propellant. Deflagration of the propellant results in the rapid generation of a large volume of gas. This gas expels the projectile from the case and propels the projectile through the barrel of the small arms or light firearm. The case may be expelled either automatically or manually. Ammunition has also been proposed which does not comprise a case. This is sometimes known as caseless ammunition. An example of such ammunition is set out in U.S. Pat. No. 2,307,369 (Ferrel). This discloses a round of ammunition comprising a caseless projectile having a body defining a cavity which is filled with a propellant charge. One end of the projectile is closed by an integral nose while an opposite end is closed by a firing cap. A soft metal jacket or sleeve is applied to the exterior of the projectile. The jacket is provided with shoulders that are configured to: engage with rifling of a barrel of a firearm; or, seal against the bore of a smooth bore firearm from which it is fired.

SUMMARY OF THE DISCLOSURE

A projectile body and a corresponding ammunition round are disclosed. The round of ammunition may be used with or without a case. One general idea behind the disclosed projectile body and ammunition is to facilitate an equalisation of pressure between a portion of a length of the outside of the round and the inside of a barrel of a firearm from which the ammunition is fired. This is believed to reduce drag and thereby increase muzzle velocity. Additionally, this pressure equalisation allows for the use of a wider range of materials of construction than if the equalisation of pressure is not possible. The structure of the projectile body is in substance the same irrespective of whether the corresponding round is cased or caseless. Provision of a case easily adapts the round to be used with conventional small arms and light firearms without need of any modification to the firearm.

For ease of description throughout the remainder of this specification including the claims the term "firearm" is to be used to denote both small arms and light firearms as defined herein above. Thus, and in order to remove any doubt, the term "firearm" is intended to denote a firearm designed for use by two or more persons serving as a crew and may include heavy machine guns, and anti-aircraft guns all being less than about 100 mm in calibre; and pistols, rifles, smoothbore firearms, submachine guns, assault rifles and light machine guns. Also the terms "round", "ammunition", "round of ammunition" and "ammunition round" are all intended to have the same meaning and define a ready to fire assembly of components comprising a projectile body, a charge of propellant, a primer and optionally a case.

In one aspect there is disclosed a projectile body for an ammunition round for small arms or light firearm, the projectile body being elongated and comprising:

first and second axially opposed ends and a cavity extending between the first end and the second end, the first end being a leading end of the projectile and closed, the cavity being capable of holding a quantity of propellant for propelling the projectile body;

a plurality of seals extending about an outer surface of the body, each seal protruding radially from the body to form a substantial seal against an inner circumferential surface of the barrel, wherein two of the plurality of seals are mutually adjacent and spaced apart in a direction of a longitudinal axis of the body to form a seal bound outer surface portion of the body; and one or more holes formed in the body enabling fluid communication between the cavity and the seal bound outer surface portion of the body.

In one embodiment the projectile body comprises a plurality of holes wherein the holes are spaced about the longitudinal axis of the body.

In one embodiment each of the one or more holes has an outer opening on the seal bound outer surface portion and an inner opening that opens into the cavity and wherein for at least one of the holes the outer opening of that hole is closer to the first end than the inner opening of that hole.

In one embodiment the one or more holes are provided with temporary sealing devices. The temporary sealing devices may comprise one of (a) a frangible seal, (b) a seal arranged to eject from the holes, or (c) a seal arranged to melt or combust; all by action of deflagration of propellant held in the cavity.

In one embodiment when the cavity holds propellant comprising a plurality of grains of a solid propellant each hole is arranged to have a diameter at least at one point between the cavity and the seal bound outer surface portion that is no greater than about three times an average grain size of propellant.

In one embodiment the body comprises a boat tail portion located between an end of the seal bound outer surface portion of the body and the second end.

In one embodiment the first end terminates with a planar surface perpendicular to the longitudinal axis.

In one embodiment the first end terminates in a point being coaxial with the longitudinal axis.

In one embodiment the first end comprises a ballistic soft tip coupled with the first end of the body.

In various embodiments the cavity is a single cavity for holding the propellant and has a longitudinal center line co-axial with longitudinal axis of the body.

In all embodiments the projectile body may optionally comprise a sleeve disposed in the cavity and wherein the one or more holes extend through the sleeve into the cavity, wherein propellant for propelling the projectile body is held in the sleeve.

In all embodiments the projectile body may be arranged such that a spacing L between outer most points of two axially most spaced apart seals satisfies the relationship $L \geq D$, where D is the diameter of the maximum of diameter of the projectile body.

In a second aspect there is disclosed an ammunition round comprising:

a projectile body according to the first aspect;

a quantity of propellant held in the cavity;

a base seal closing the second end to confine the propellant in the cavity; and a primer supported in the base seal.

In a third aspect there is disclosed an ammunition round comprising:

a projectile body according to the first aspect;

a tubular case sealed at one end by a base, the case fitted over a portion of the projectile body with the base adjacent the second end of the projectile body and closing the cavity;

a quantity of propellant retained within the cavity by the base, and wherein the first end of the projectile body protrudes from the case.

In some embodiments of the ammunition round of the third aspect, the case and the projectile body are relatively dimensioned so that the case at least partially overlies at least one seal on the projectile body. Thus in such embodiments the case may for example: wholly overlie or cover every seal; or, leave wholly exposed a forward most seal and completely overlie or cover all other seals; or partially cover a forward most seal and completely overlie or cover all other seals.

However in alternate embodiments of the ammunition round of the third, the case and the projectile body are relatively dimensioned so that every seal on the projectile lies outside of the case.

In one embodiment of the ammunition round of the second or third aspects, the quantity of propellant is such that substantially the entire cavity is filled with the propellant. However in alternate embodiments of the third aspect a portion of the propellant is in the cavity and another portion of the propellant is between the second end of the projectile and the one end of the case.

In some embodiments of the third aspect the projectile and the case are relatively dimensioned such that a space is formed between the second end of the projectile body and the base of the case and the propellant is retained between an inner surface of the cavity and the base of the case. In one form of such embodiments the propellant is provided in a volume greater than that of the space so that at least a proportion of the propellant is held in the cavity. However in an alternate form of such embodiments the propellant is provided in a volume to substantially fill the space and the cavity.

BRIEF DESCRIPTION OF THE DRAWINGS

Notwithstanding any other forms which may fall within the scope of the projectile body and corresponding ammunition round as set forth in the Summary specific embodiments will now be described, by way of example only, with reference to the accompanying drawings in which.

DETAILED DESCRIPTION OF SPECIFIC EMBODIMENTS

Figure 1:
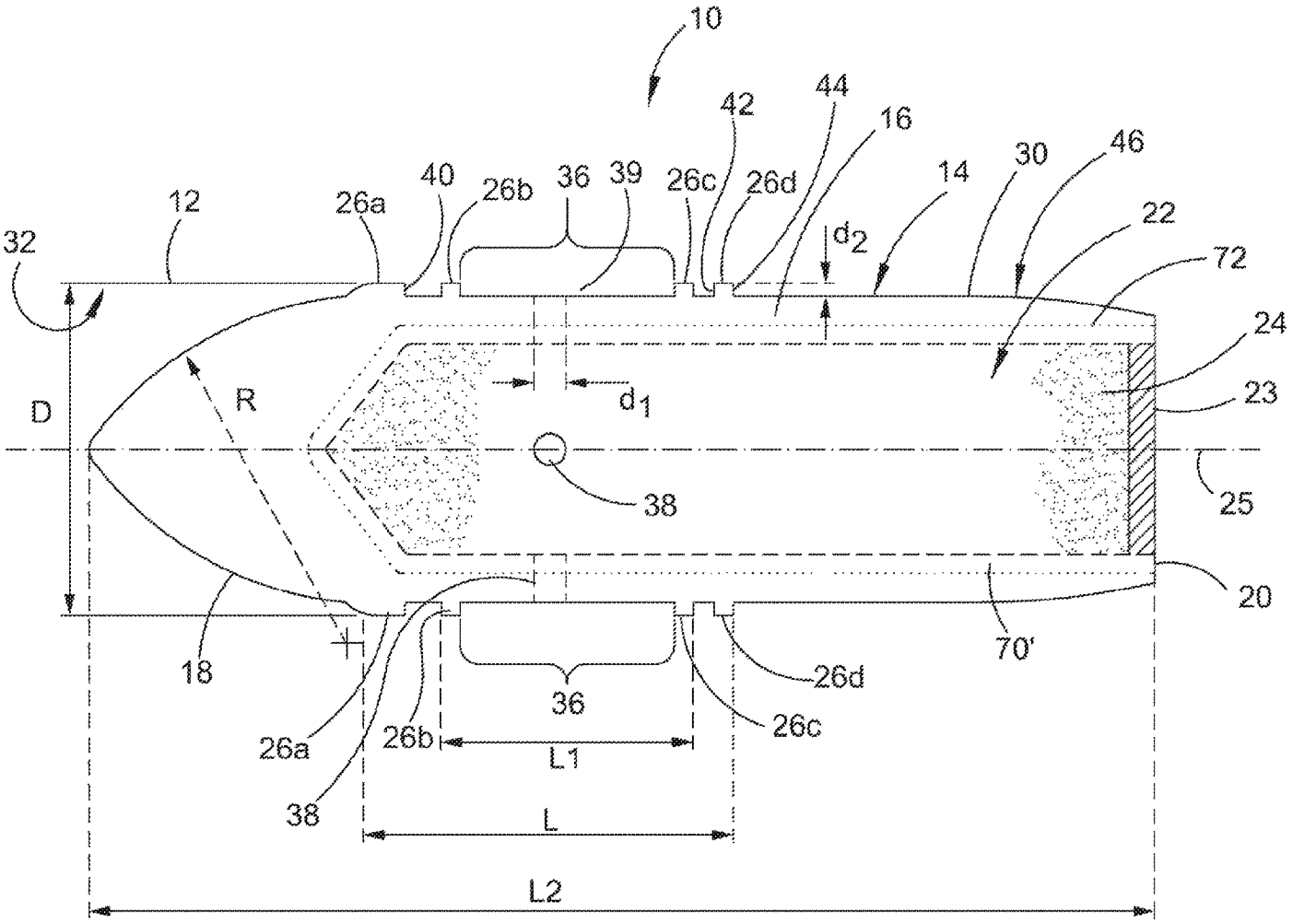
FIG. 1 is a schematic representation of one embodiment of a projectile body.

FIG. 1 depicts an embodiment of an incomplete round of ammunition 10 (hereinafter referred to in general as "round 10") in-situ in a barrel 12 of a firearm such as a rifle. For the purposes of exemplifying features of the round 10, the round 10 is described in the context of use in or with a 44 magnum firearm. However embodiments of the round 10 are not limited to only this type or calibre of firearm. (The round 10 as shown in FIG. 1 is "incomplete" as it does not depict a base seal and primer.)

The round 10 comprises a projectile 14 having an elongated body 16 with a first end or tip 18 and an axially opposed second end 20. The tip 18 constitutes the leading end of the round 10 and is closed. A cavity 22 is formed in the body 16 and extends from an inside of the tip 18 to the second end 20. A quantity of propellant 24 is held within the cavity 22 for propelling the projectile. In one embodiment (for example the embodiment of FIG. 1), the end 20 and cavity 22 are closed by a base seal 23. However in an alternate embodiment (for example shown in FIG. 3) the end 20 and cavity 22 may be closed by the provision of a case which is fitted over the body 16. In all embodiments a propellant ignition device (e.g. a primer) can be located integrally with the seal/case or external to the assembled round. Also the cavity is a single cavity for holding the propellant and has a longitudinal center line co-axial with a longitudinal axis 25 of the body.

The projectile body 16 is provided with a seal arrangement which in the illustrated embodiments is constituted by a plurality of seals 26a, 26b, 26c and 26d (hereinafter referred to in general as "seals 26") that extend about an outer surface 30 of the body 16. Each seal 26 protrudes radially from the body 16 to form a substantial seal against an inner circumferential surface 32 of the barrel 12. The seals 26 in this embodiment are arranged in two sets of two seals where the seals in a set are spaced relatively closely to each other, but the sets are spaced apart by a greater distance. Specifically the seals 26a and 26b form a first set of seals; and seals 26c and 26d form a second set of seals.

The seal arrangement preforms various functions including: creating a seal between the body projectile 16 and the barrel 12 to stop pressure escaping forward of the projectile; stabilize/support the projectile 14 near its front and rear as it travels down the barrel 12; minimise drag down the barrel 12; and, for a cased embodiment of the round 10, support the projectile body 16 in the case. At least two seals are required to perform all of these functions, one at or near the first end/tip 18 and a second spaced from the first seal and nearer the second end 20.

Each pair of mutually adjacent seals forms a corresponding seal bound outer surface portion of the body. For example seals 26a and 26b form a seal bound outer surface portion of the body (of a relatively short axial length); as do the pair constituted by inner most seals 26b and 26c, (of a substantially greater axial length). The seal bound outer surface portion 36 between the seals 26b and 26c accommodates one or more holes 38. The one or more holes 38 are formed in a body 16 to enable fluid communication between the cavity 22 and the seal bound outer surface portion 36.

When the round 10 is fired from a firearm the propellant 24 progressively deflagrates. The deflagration causes the rapid generation of a large volume of gas which propels the round 10 along the barrel 12. The majority of the generated gas is exhausted through the second end 20. When the round 10 is not provided with a case, this occurs by virtue of the gas either blowing out or burning through the base seal 23 fitted to the end 20. When the round 10 is used with a case, the release of gas through the end 20 initially ejects the body 12 from the case. Irrespective of whether the round 10 is cased or caseless, the pressure of the generated gas acts substantially instantaneously in all directions.

Thus gas within the cavity 22 will exert pressure on the walls of the body 16 tending to increase the outer diameter of the body 16 and pushing the surface 30 toward the surface 32. Also gas pressure acts between the inner surface 32 of the barrel from the second end 20 up to the seal 26b. However, in the region 39 between the portion 36 and the surface 32, which is sealed from the proximal end of the barrel 12, the pressure of the deflagrating gas is exerted substantially from within the cavity 22 only. (The region 39 is a dynamic region because the projectile is travelling along the barrel 12.) The provision of the holes 38 in the present embodiment allows fluid communication between the cavity 22 and the seal bound outer surface portion 36. As a result, there will be a substantial equalisation of gas pressure on opposite sides of the wall of the body 16 about the seal bound outer surface portion 36. Consequently, there is substantially no net force applied from the cavity 22 onto the corresponding portion of the body 16 that may otherwise tend to cause radial expansion of the body 16 so as to contact the surface 32. In turn this minimises the risk of increasing drag thereby maximising muzzle velocity.

Due to the equalisation of pressure arising from the provision of the holes 38 it is possible to make the body 16 from materials which may have a lower strength than those which would otherwise be required in order to resist such radial expansion. Some of these materials may have a relatively high density (e.g. lead) but in the absence of the holes 38 would need relatively thick wall to resist radial expansion. This would reduce the volume of the cavity and thus the amount of propellant 24. As the present embodiment enables the use of thinner walls it is possible to make for example the body 16 from lead without reducing the volume of the cavity 22. An alternately beneficial effect of this embodiment is that it enables the body 16 to be made from thinner walled material than would otherwise be possible in order to resist the outward radial expansion. In the first instance, where say a lower strength but higher density material is used, greater stopping power may be derived by virtue of the increased mass having regard to the kinetic energy of the projectile 14 being calculated using the equation $E=\frac{1}{2} mv^2$. However in the second instance where a projectile is manufactured with thinner walls and may otherwise be possible in the absence of the holes 38, increased stopping power is achieved by virtue of the lighter mass being able to accelerate more quickly and reach higher muzzle velocity. It would be recognised from the aforementioned kinetic energy equation of $E=\frac{1}{2} mv^2$, that improving velocity provides a squared increase in kinetic energy.

The holes 38 may be considered as pressure bleed or equalisation holes. A plurality of such holes 38 can be provided spaced about the axis 25 of the projectile 14 in such a manner as to ensure no adverse impact on the balance and stability of the projectile. For example, four holes 38 may be provided in a common transverse plane spaced 90° apart about the axis 25. The holes 38 are shown in this embodiment as circular in transverse section, but other transverse section shapes are possible such as but not limited to oval, oblong, and rectangular. In one embodiment in order to prevent or at least minimise the expelling of propellant 24 through the holes 38 during manufacture, transport, storage or an initial phase of deflagration, the holes 38 may be dimensioned to have, at least at one point between the cavity 22 and the seal bound outer surface portion 36, an internal diameter D1 that is no greater than three times an average grain size of the propellant. By dimensioning the holes 38 in this manner grains are more likely to bridge across the inner diameter of the holes 38 rather than pass through and escape from the holes 38. However the bridged grains will form pathways that allow the escape of gas through the holes 38.

If for any reason it is found necessary to form the holes larger than the above dimensions, alternative sealing arrangements of the holes may be necessary to prevent leakage of the propellant. The selection of the sealing arrangements shall be such that upon deflagration, the holes become sufficiently clear to allow the equalisation of the pressures to occur in the same manner as if the holes were unsealed. Indeed irrespective of hole diameters in other embodiments each or any hole 38 may be provided with temporary sealing arrangements or devices such as (a) a frangible seal, (b) a seal arranged to eject from the holes, or (c) a seal arranged burn away or melt; all by action of deflagration of propellant held in the cavity. A frangible seal may be a thin metal foil or plastic film; an ejectable seal may be made from of a stopper made form cellulose, wood or cork; while sealing devices that burn or melt be also be made from paper, wax, plastics, lead, or thin metal foil. The sealing arrangements or devices of course also act to retain the propellant within the cavity 22 during manufacture, handling, transport and storage. Additionally the sealing arrangements or devices can provide protection against the external environment to minimize degradation due to for example moisture absorption or oxidation.

Figure 2:
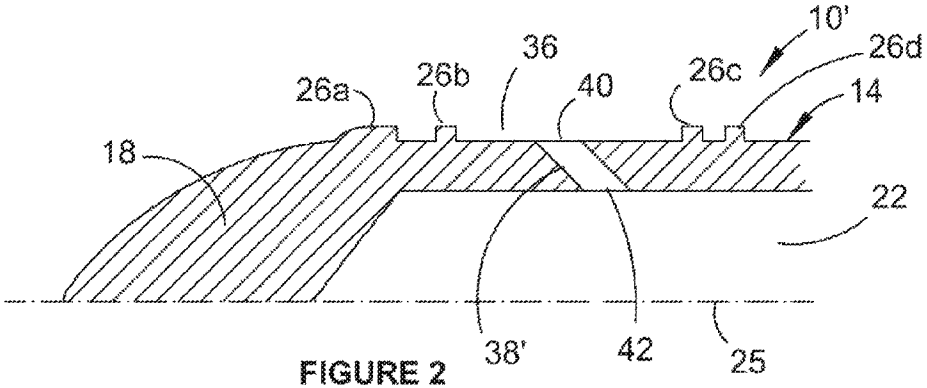
FIG. 2 is a partial section view of a second embodiment of the projectile body.

In the present embodiment shown in FIG. 1 the holes 38 extend in a radial direction transverse to the axis 25. However as shown in FIG. 2, the holes 38 are formed with an alternate configuration. FIG. 2 illustrates an embodiment of a round 10' which differs from the round 10 depicted in FIG. 1 only by way of configuration of its respective holes designated as 38'. In the projectile 10', the holes 38' extend obliquely relative to the longitudinal axis 25 of the round 10. The angle of inclination of the hole 38' is such that an outer opening 40 of the hole 38' formed on the seal bound outer surface portion 36 is closer to the tip 18 than an inner end 42 of the hole 38'. A potential benefit of the inclining of the holes 38' in this manner is that once the round 10 has been ejected from the barrel 12 and the propellant 24 has fully or substantially deflagrated, the holes 38' provide a channel for air to flow into the cavity 22 and out from the second end 20. This airflow can reduce drag associated with turbulence generated at the second end 22. As an alternative embodiment, the holes may be elongated or slotted in an axial direction to provide the same effect.

Further features and variations of the projectile 14 and corresponding round 10 will now be described.

In the depicted embodiment, the tip 18 is in the form of an ogive. The ogive has a radius R of about 2.5 times diameter D of the projectile 14. The diameter D of the round is its maximum diameter and corresponds with the calibre of the round. Thus with reference to FIG. 1, R=2.5 D. In the context of the round 10 being for a 44 magnum calibre firearm, D=0.429" (about 10.9 mm). However, the tip 18 may be formed in other known configurations including for example but not limited to, hollow points, soft points, full metal jacket, spitzer, flat nose, semi-wad cutter and wad cutter. The ogive tip 18 may be a secant ogive or a tangential ogive.

The seals 26 in this embodiment are formed integrally with and from the same material as the body 14. That is the seals 26 and the body 14 constitute a one piece structure. This may be achieved for example by a casting process, swaging, machining, or a combination of any or all. It is however also possible to form the seals separately from the body 14 and subsequently engage or otherwise couple the seals 26 to the body 14. For example this may be achieved by providing grooves in the body 14 and subsequently seating split ring bands in the grooves which act as the seals 26. Such seals can be made for example from a material having radial resilience or spring nature such as spring steal; or materials which are plastically deformable such as lead or copper; also it is not necessary for the seals 26 to be made from the same material as the body 16. In a further variation, the seals 26 may be made separately from the body 14 and formed as single continuous rings which are subsequently cast into the body 14. That also results in the seals 26 and the body 14 constituting a one piece structure. The core of the projectile could be clad in a material of different composition to better suit the purpose of sealing and contact with the firearm bore.

In the present embodiment the seals 26 are arranged as two pairs. A first pair of seals 26a and 26b is located adjacent or near the tip 18 while the second pair of seals 26c and 26d is spaced from the first pair in an axial direction toward the second end 20. The spacing between the inner most seals 26b and 26c defines the seal bound outer surface portion 36. In alternate embodiments, the seals may be provided as two single seals that are axially spaced along the body 14 to form the seal bound outer surface portion 36. Thus with reference to FIG. 1, this can be achieved by forming the round 10 with only for example the seals 26a and 26c; or 26a and 26d; or 26b and 26c; or 26b and 26d.

A spacing L between outer most points of the two axially most spaced apart seals 26a and 26d will preferably satisfy the relationship L≥D. Naturally in the event of the seal arrangement comprising two sets of two or more seals, as in the specific embodiment shown in FIG. 1, this spacing relationship is also necessarily be satisfied by having a spacing L1≥D between the outer most points of the inner seals 26b and 26c.

Although in some cases L<D is possible, for stability of the projectile 10 as it travels down the barrel 12 it is believed the outer most seals 26a and 26d should be separated by at least one diameter of the projectile 14. In other embodiments, this spacing may be equivalent to the length of the parallel sides of the body 16. In this regard, it will be noted from FIG. 1 that the tip 18 of the projectile 14 is tapered to reduce in width forming the rounded nose. Also, a rear portion of the projectile 14 is tapered to reduce in outer diameter to form a "boat tail". (The formation and effect of the boat tail will be described later). However between the tip 18 and the tapered back portion of the body 12, the projectile 14 has parallel sides. Stated another way, any axial plane between the tip 18 and the tapered back portion of the body 12 will intersect the outer surface 30 to form two parallel lines. The inner most seals 26b and 26c can be spaced apart to be at respective opposite ends of these lines. In such instances, again depending on the calibre of the projectile, the internal profile of the cartridge case and its overall length, this distance may be greater than D.

When the seals are provided as sets of two seals 26a, 26b; and 26c, 26d the spacing between each seal in its respective set may be in the order of the axial length of each seal.

It will be noted that in this embodiment the forward most or leading seal 26a is formed with a rounded leading face being a contiguous portion of the tip 18 with a change in radius of curvature. A trailing face 40 of the seal 26a forms a right angle shoulder with the outer surface 30 of the body 16. Each of the seals 26b, 26c and 26d has a circumferential outer surface of constant radius and is formed with right angle leading and trailing faces 42 and 44 (shown in relation to seal 26d only). The axial length of the seals 26b, 26c and 26d are the same as each other, but shorter than the axial length of the seal 26a.

As discussed above, a rear portion of the projectile 14 is formed in the configuration of a boat tail 46. The provision of a boat tail 46 improves the ballistic performance of the round 10 and also allows seating of the projectile 14 in a case or cartridge deeper than if the boat tail was not present, therefore allowing more of the propellant charge to be contained within the projectile body. (This is explained in greater detail below with reference to FIG. 3). The boat tail 46 is provided with a taper of approximately 10° over a length of about one diameter D of the projectile 14 or as appropriate for the internal profile of the case.

In one embodiment the entirety of the cavity 22 of the projectile is filled with propellant 22 so that there is in essence no free space (save for the holes 38) within the cavity 22. As a consequence, upon initial burning of the propellant 24 the resultant gas pressure has the effect of compacting the propellant against interior walls of the cavity 22. This is to be contrast in situations where a projectile may include for example a cavity in the tip 18 which is not filled with propellant; or otherwise has a cavity 22 that is not completely filled with propellant. In such instances, the perceived advantages of containing the deflagrating propellant within the projectile body may not be fully realized.

In an example of the round 10 being applied to a 44 magnum calibre firearm, the round 10 may have the following dimensions:

Overall length L2=1.504" (38 mm)

A maximum diameter D=0.049" (11 mm)

Diameter of hole 38 d1=0.040" (1 mm)

Radial projection distance of seals 26 beyond parallel portions of outer surface 32 of the body 30 d2=0.040" (1 mm)

Figure 3:
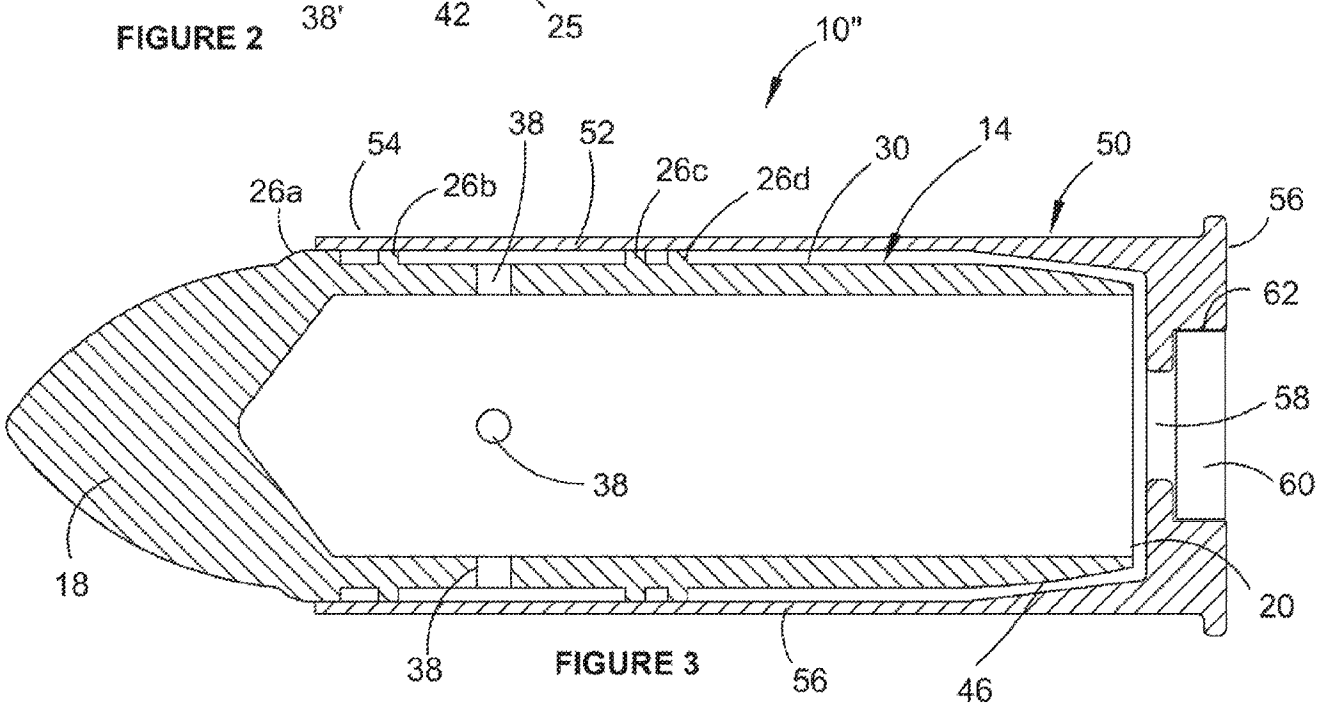
FIG. 3 is a schematic representation of a round of ammunition incorporating the projectile body of FIG. 1.

FIG. 3 depicts a cased version of a round of ammunition designated as 10". The round 10" comprises the combination either of the round 10 or 10' together with an external case 50. The case 50 is of conventional construction and in essence comprises tubular body 52 that is open at a front end 54 and closed at a base 56. A circumferential wall 56 of the tube 52 increases in thickness by way of a reduction of its internal diameter in the direction from the front end 54 to the base 56. This increase in wall thickness and reduction in internal diameter is in a portion of the case 50 adjacent the base 56. The distance from the opening of the case to the point within the case where the internal taper commences dictates the maximum possible length of a portion of the projectile having parallel sides within the case 50. This accommodates the boat tail 46 of the projectile 14 so as to maintain a relatively constant spacing between the outer surface 30 of the body 16 and the internal diameter of the case 50. The base 56 is provided with a flash hole 58 in alignment with a primer 60. The primer 60 is fitted into a central recess 62 formed in the base 56. When the primer 60 is initiated, typically by impact with a firing pin, a flame is produced which passes through the flash hole 58 to ignite propellant 24 within the cavity 22 of the projectile 14.

The projectile 14 and case 50 are configured so that when assembled and prior to firing, the front end 54 of the case 50 is adjacent or near the forward most seal 26a. In some but not necessarily all embodiments the front end may be in contact with and/or partially overlie the forward most seal 26a. Also in this embodiment the front end 54 does not extend beyond the forward most seal 26. The case 50 can be configured particularly in relation to its outer diameter to match the breach of any conventional firearm. In this way, the benefits of the caseless version of the round 10 can be enjoyed with any conventional firearm simply by loading the suitably designed projectile 14 into a case 50 configured to match the breach of the firearm.

It should be appreciated that the configuration of the round 10" is different to a conventional round comprising a projectile and case where the propellant is held within the case between a base of the projectile and inside of the base of the case. This differences lie in that in the present embodiments at least some of the propellant is held within the projectile 14; and, the projectile 14 includes a portion that extends for a substantial length of the inside of the case 50 (being at least about one half but up to the full length of the case 50).

In the event that the projectile 14 extends for substantially the full length of the case the second end 20 of the projectile 14 will be in contact with or close to an inside surface of the base 56. In such circumstances substantially all of the propellant 24 is held within the cavity 22. But in other embodiments where say the projectile 14 occupies from say ½ to ⅔ of the length of the case 50, while all of the propellant 24 still resides between an inside surface of the cavity 22 and the base 56, a substantial volume of the propellant 24 may lie outside of the cavity 22 in a space between the end 20 and the base 56. This may occur for example where the volume of propellant 24 is substantially less than the combined volume of the cavity 22 and the volume of the space between the end 20 and the base 56. Irrespective of the proportion of propellant in the cavity 22, ordinarily the tip 18 will project beyond the forward most end 54 of the case 50.

Figure 4:
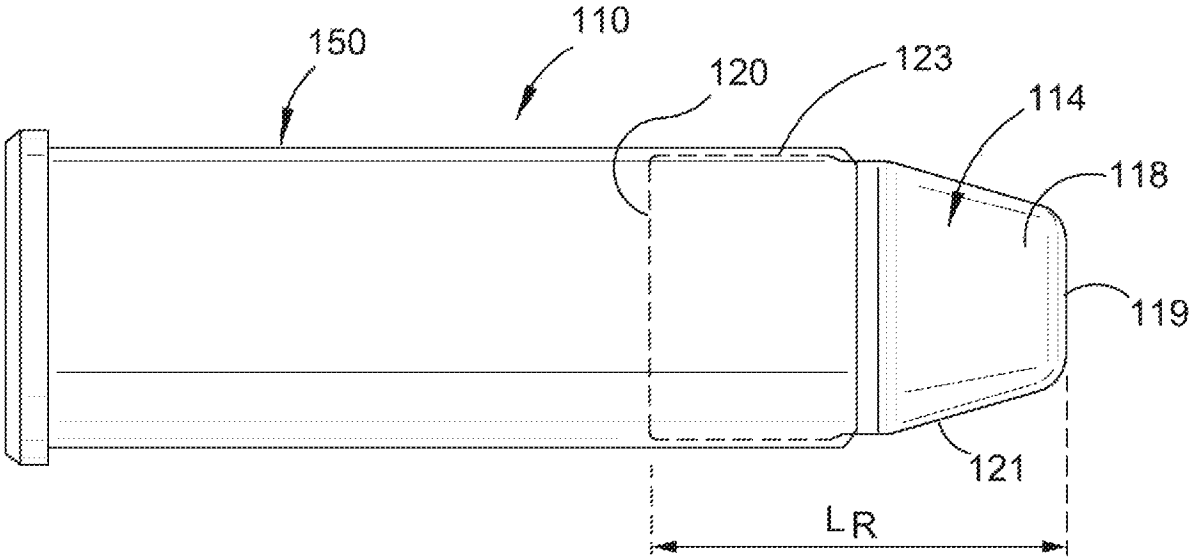
FIG. 4 is a schematic representation of a prior art 44 magnum round of ammunition.

For the purposes of comparison, FIG. 4 is a representation of a prior art 44 Remington magnum round 110. The round 110 comprises a projectile 114 crimped to a case 150. The case 150 may be identical to the case 50 of the round 10". A comparison however between the projectiles 14 and 114 highlights various benefits and superior features of embodiments of the present projectile 14. In this regard it is noted that the exposed portion of the projectile 114 in round 110 has a tip 118 provided with a flat nose 119. Also the circumferential surface of the projectile 114 from the flat nose 119 is formed with a surface portion 121 that progressively and linearly increases in outer diameter in a direction toward the case 150. A second or back end 120 of the projectile 114 terminates a relatively short distance within the cartridge 150. A portion 123 of the circumferential surface of projectile 114 within the case 150 has a substantially constant outer diameter until very close to the second end 120 where it tapers inwardly. A typical overall length $L_R$ for the projectile 114 may be about 0.64 inches (16.26 mm). The projectile body 16 and the case 50 are dimensionally related in terms of their respective lengths so that the projectile does not protrude excessively from the case and retains volume within the case to contain the propellant charge.

A comparison between the projectiles 14 and 114 highlights the following:

(a) The outer surface of the tip 18 and projectile 14 is radiused to a point rather than being linearly tapered to a flat nose 119 as in the projectile 114. As a consequence of this, the "front end" aerodynamics of the projectile 14 are superior to those of the projectile 114 in terms of reducing drag, turbulence and air resistance. It is not possible to simply transfer the configuration of the tip 18 of projectile 14 to the projectile 114. The reason for this is to accommodate the curvature of the tip 18 substantially the full length of the projectile 114 will be required to be formed with a radiused outer surface. This will result in only a very small band of the projectile 114 having an outer diameter matched to the calibre of the barrel from the firearm from which it is fired. As a result in-barrel stability may be substantially compromised. To provide good in-barrel stability it is generally recommended that effective length of the projectile 14 in contact with the inner surface (and rifling) of a barrel be about the same as the diameter of the projectile.

(b) The cased version of the round 10" is provided with a boat tail 46 near the second end 20. The boat tail reduces turbulence and thereby further increases or improves the aerodynamics of the projectile 14. With the projectile 114, it is physically not possible to incorporate the boat tail as there is insufficient length in the projectile 114 on which to form the boat tail while also maintaining recommended minimum contact area between the projectile 114 and the inside surface of a firearm barrel. This allows a longer and lighter projectile 14 to be made that does not adversely compromise the potential propellant charge or make the projectile excessively heavy.

(c) In the projectile 114 substantially the full length of the portion 123 of the projectile 114 is in contact with the inner surface of a firearm barrel. In comparison however with the projectile 14 of the round 10" it is only the outer circumferential surfaces of the seals 26 that are in contact with the inner surface of the barrel. This total contact area is substantially smaller than the contact area of the projectile 114 and thus there is less drag between the projectile 14 and the barrel in comparison to that for the projectile 114. Nonetheless, stability is maintained or indeed can be improved with the projectile 14 by virtue of the spacing of the seals 26a and 26d. The improved stability may be derived by spacing the outer most seals 26a and 26d by a distance greater than the one diameter of the projectile 14. This is possible with the projectile 14 as its overall length is substantially greater than: its diameter; and, that of the projectile 114.

(d) By virtue of the pressure equalisation holes 38 it is possible to vary the material and weight of the projectile 14 to suit a particular task. For example, the projectile 14 may be made from a relatively light material so that the overall weight of the projectile 14 may be less than that of the projectile 114. While on the face of it this may seem to be a disadvantage, the lighter weight results in a higher velocity of the projectile 14 in comparison to the projectile 114 for the same amount of propellant. Increasing the velocity has a square effect on increasing kinetic energy and thus stopping power whereas changes in mass produce only a linear change in kinetic energy.

Each of the above differences and/or benefits arise from various features of the disclosed projectile and will be realized whether or not the associated round of ammunition is cased or caseless.

Whilst a number of specific embodiments of the round have been described it should be appreciated that the round may be embodied in many other forms. For example, round 10 is depicted with a projectile 14 having a boat tail 46 near the end 20. However in alternate embodiments, the projectile 14 may be formed with a constant outer diameter up to the end 20. This is particularly applicable in the uncased or caseless version of the round 10. In this instance, if desired, further seals 26 may be formed about the body 16 between the seal 26d and the end 20 to engage and form a seal with the inside surface 32 of the barrel 12. In this event additional holes 38 may be formed between such seal and the seal 26d to provide pressure equalisation.

The round 10, 10', 10" may be formed with only two spaced apart seals, for example 26a and 26d. In this instance it will be these seals that form the seal bound outer surface portion 36. In another embodiment the round may be formed with a plurality of axially spaced seals 26 where each mutually adjacent pair forms a respective seal bound outer surface portion (as indeed is the case with the current depicted embodiments with seals 26a, 26b, 26c and 26d) but where there is at least one hole 38 that provides fluid communication between the cavity 22 and two or more of the seal bound outer surface portions. In such an embodiment the seals may be evenly spaced in the axial direction. Irrespective of how many seals 26 are provided in excess of two seals required to form a seal bound outer surface portion, the spacing between the two outer most seals may be a minimum of about one diameter D of the round.

Figure 5:
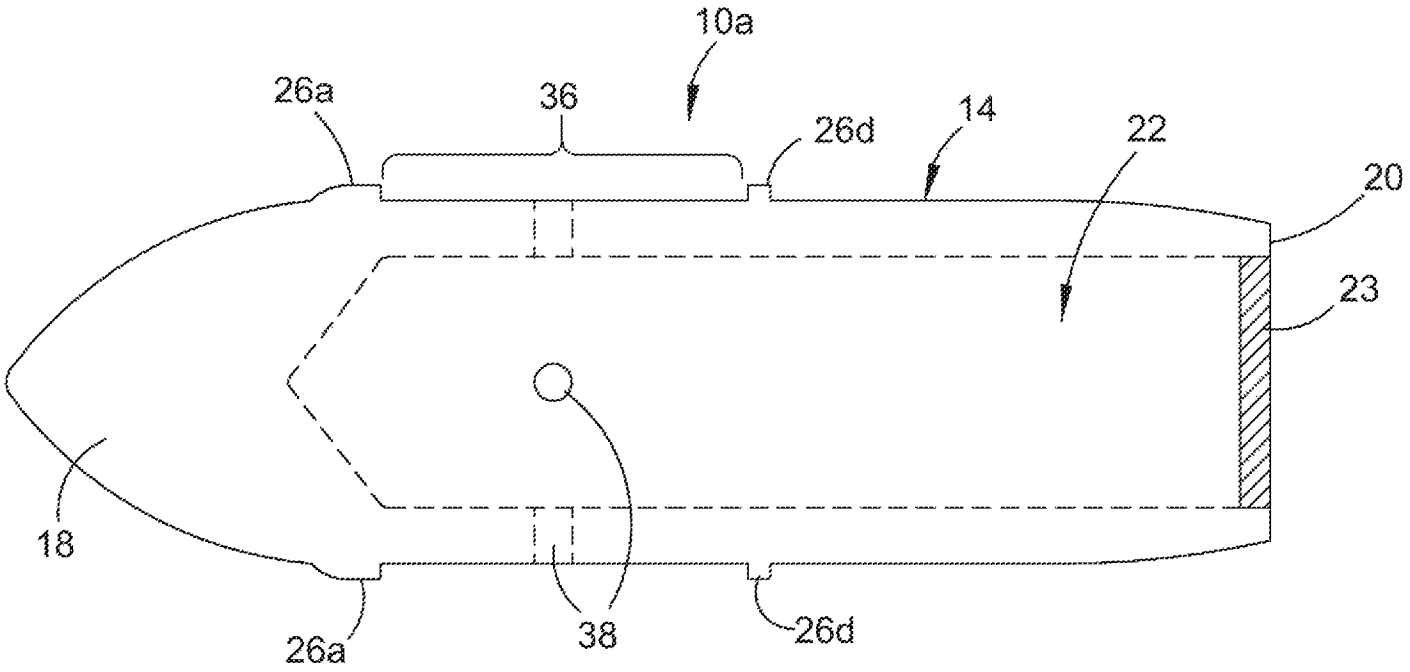
FIG. 5 is a schematic representation of a projectile body for a third embodiment of an ammunition round.

The above and other variations are depicted in FIGS. 5-9. FIG. 5 depicts a round 10a which differs from the round 10 only by way of exclusion of the seals 26b and 26c. Thus the round 10a now only has two seals namely seals 26a and 26d. These two seals between them define the seal bound outer surface portion 36. Holes 38 are arranged to open into the seal bound outer surface portion. In all other respects, the round 10a is the same as round 10 and may be used in either a cased or uncased manner.

Figure 6:
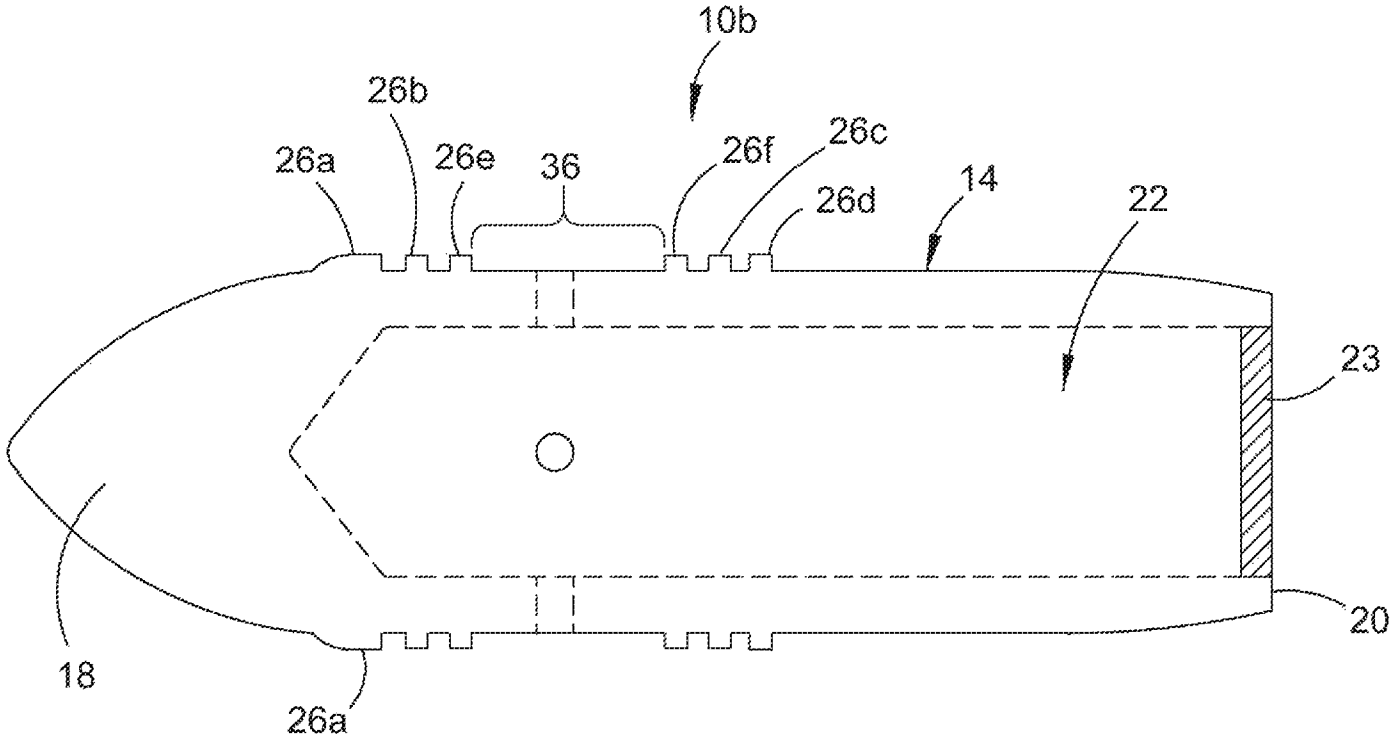
FIG. 6 is a schematic representation of a projectile body for a fourth embodiment of an ammunition round.

FIG. 6 depicts an embodiment of a round 10b which differs from the round 10 shown in FIG. 1 by arranging the seals in two sets of three closely spaced seals. Thus the seal arrangement in the projectile 10b now comprises a first set of seals 26a, 26b and 26e which are closely spaced from each other and near the first end 18 of the projectile 10b; and a second set of three seals namely seals 26f, 26c, and 26d that are axially spaced from the first set of seals. The seal bound outer surface portion 36 comprises the region of the outer surface of the body 14 bound between the two inner most adjacent seals 26e and 26f. Thus the holes 38 open into the region 36. The projectile 10b can be used in either a cased or uncased manner.

Figure 7:
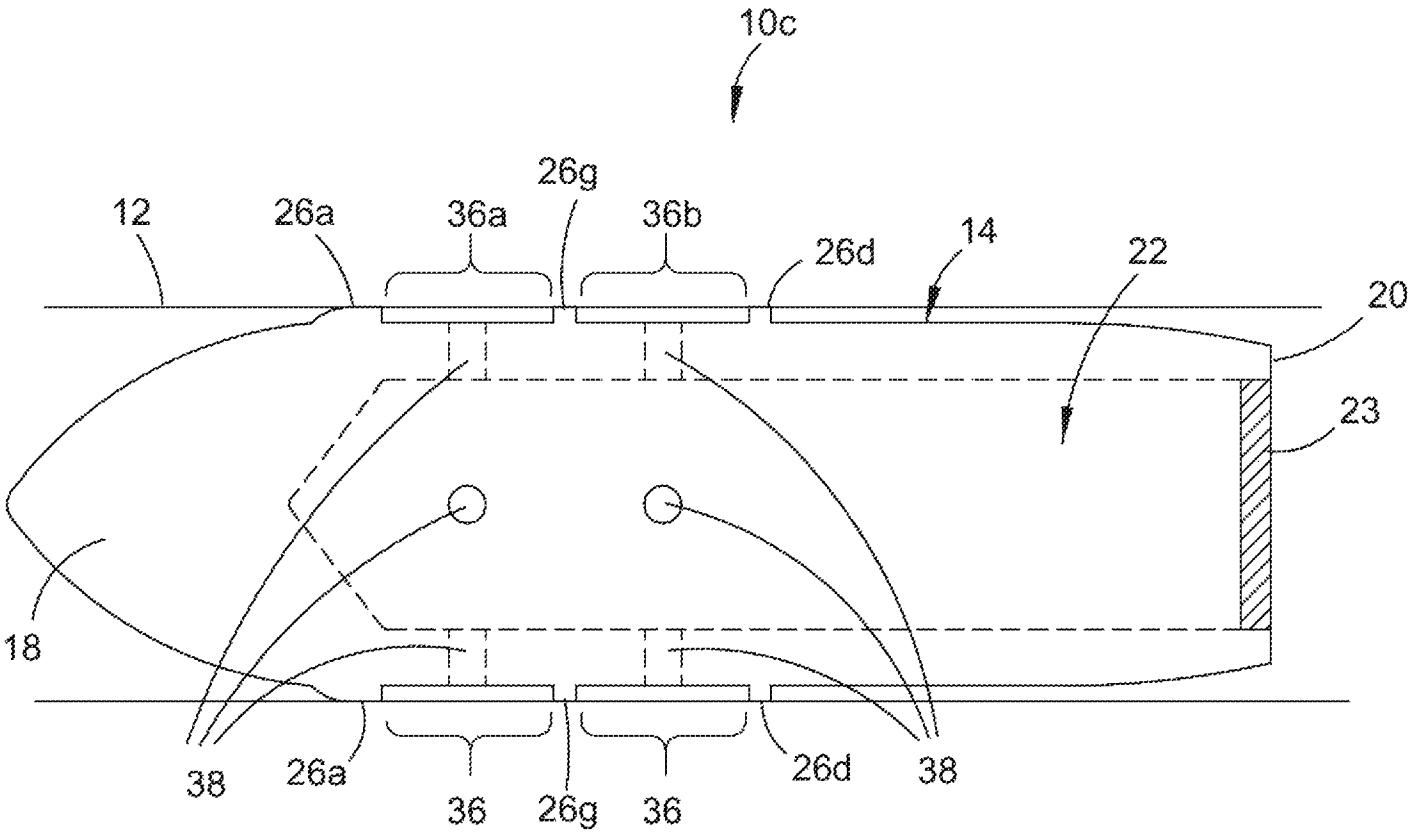
FIG. 7 is a schematic representation of a projectile body for a fifth embodiment of an ammunition round.

FIG. 7 depicts a further possible variation in the configuration of a round 10c in accordance with the present disclosure. Here, the round 10c comprises three sets of seals each set comprising one seal only. The first set of seals comprises a seal 26a, the second set comprises the seal 26g, and the third set comprises the seal 26d. Seal 26g is axially spaced from the seal 26a in a direction toward the second end 20. The seal 26d is axially spaced from the seal 26g also in a direction toward the second end 20. This arrangement of seals provides the round 10c with two seal bound outer surface portions 36a and 36b. The seal bound outer surface portion 36a is defined between the seals 26a and 26g; while the seal bound outer surface portion 36b is defined between the seals 26g and 26d. Holes 38 are provided in the projectile 14 to enable pressure equalisation between the cavity 22 and an inside surface of a barrel 12 of a firearm in each of the seal bound outer surface portions 36a and 36b.

Thus, the round 10c has a plurality of seals 26a, 26g and 26d which protrude radially from the body 16 of the projectile 14 to form a substantial seal against an inner circumferential surface of a barrel of a firearm 12. Further, two of the seals either 26a and 26g; or 26g and 26d; are mutually adjacent and spaced apart in a direction of a longitudinal axis of the body 16 to form respective seal bound outer surface portions of the body. Naturally, the seal 10c may comprise further variations such as forming each of the three sets of single seals as three sets of two or more closely spaced seals. The projectile 10c may be used in either a cased or uncased version in the same manner as described above in relation to the projectile 10.

Figure 8:
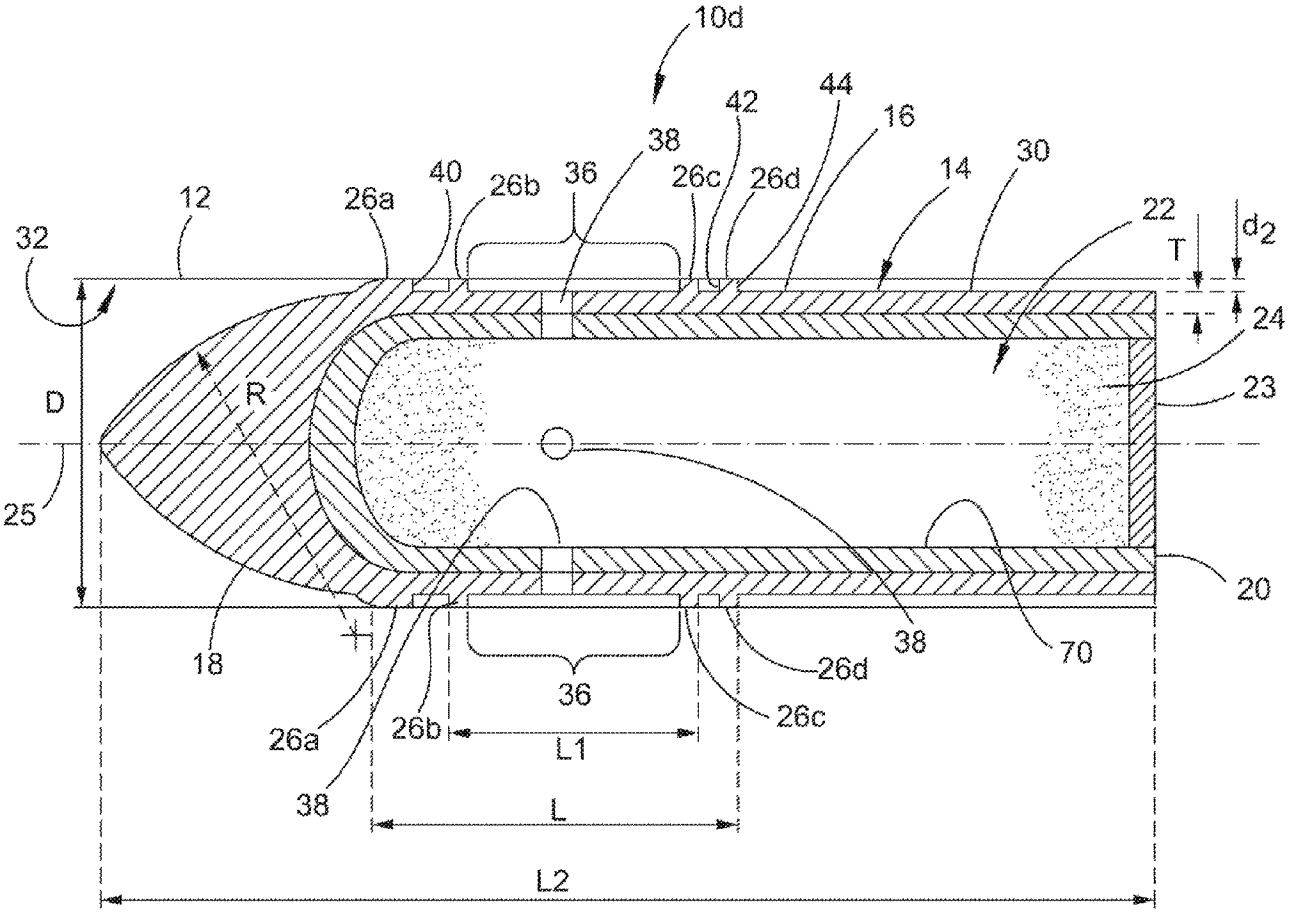
FIG. 8 is a schematic representation of a projectile body for a sixth embodiment of an ammunition round.

FIG. 8 depicts an embodiment of a round 10d which differs from the round 10 shown in FIG. 1 by: the omission of the boat tail 46; a re-shaping of the end of the cavity 22 near the first end 18; a reduction in thickness T of the wall of body 16 in the seal bound region 36 and extending to the second end 20; and, the inclusion of a sleeve 70. The sleeve 70 is closed at an end adjacent the first end 18 and open at an opposite end adjacent the second end 20. The sleeve 70 forms a lining to the cavity 22. In this embodiment the end of each of the cavity 22 and the end of the sleeve 70 near end 18 is formed with a dome like configuration. This is to be contrast with the conical configuration of the cavity 22 near the first end 18 of the first embodiment. The omission of the boat tail 46 and the reduction in wall thickness T are for the purposes of accommodating the sleeve 70 and maintaining the same (or indeed allowing a slight increase in) the volume of propellant 24 that can be loaded into the projectile 14. The holes 38 are formed through the body 16 and the sleeve 70.

The sleeve 70 may be made from a material of higher specific density than that of the body 16. This provides greater overall weight to the projectile 14 than an identically configured projectile without the sleeve and made from a lower specific gravity material. By shaping the sleeve to have a thickened wall near the end 18 the sleeve can bias the increase of overall weight toward the first end 18. However this is not an essential requirement. In an alternate configuration the sleeve can have a constant wall thickness. In one example the body 16 may be made from steel or brass while the sleeve 70 may be made from lead or depleted uranium. The sleeve 70 is not required to provide resistance to radial expansion of the projectile 16. This is due to the presence of the holes 38 which provide pressure equalization between the cavity 24 and the space defined between the seal bound outer surface portion 36 and the inside surface of the barrel 12. According while it is possible for the sleeve 70 to be stronger in terms of resisting radial expansion than the body 16 of the projectile 14 there is no need for this characteristic. Also while in this specific embodiment the boat tail 46 has been omitted this in not essential in order to include a sleeve.

This is exemplified by the dotted line 72 in FIG. 1 which together with the dashed line depicted a sleeve 70'.

The cased version of the round of ammunition 10" as shown in FIG. 3 depicts each of the seals 26 wholly or at least partially within the case 50. In particular seal 26a is partially covered by the case 50 while the remaining seals 26b-26d are wholly within the case 50. However it is not essential for every cased version or embodiment of the round to be formed such that all or indeed any of the seals are within or at least partially covered by the case 50. It is generally not preferred for the projectile to engage with rifling in a barrel until the round is fired. Thus depending on the configuration of the firearm including its breach and barrel, embodiments of the disclosed ammunition round are possible where one or more seals 26 lie outside of the case 50. For example with reference to FIG. 3 depending on the firearm configuration and geometry, the round 10" could be modified so that the case 50 terminates at a point radially coincident with a leading edge of the seal 26b; or say between seals 26a and 26b.

Figure 9:
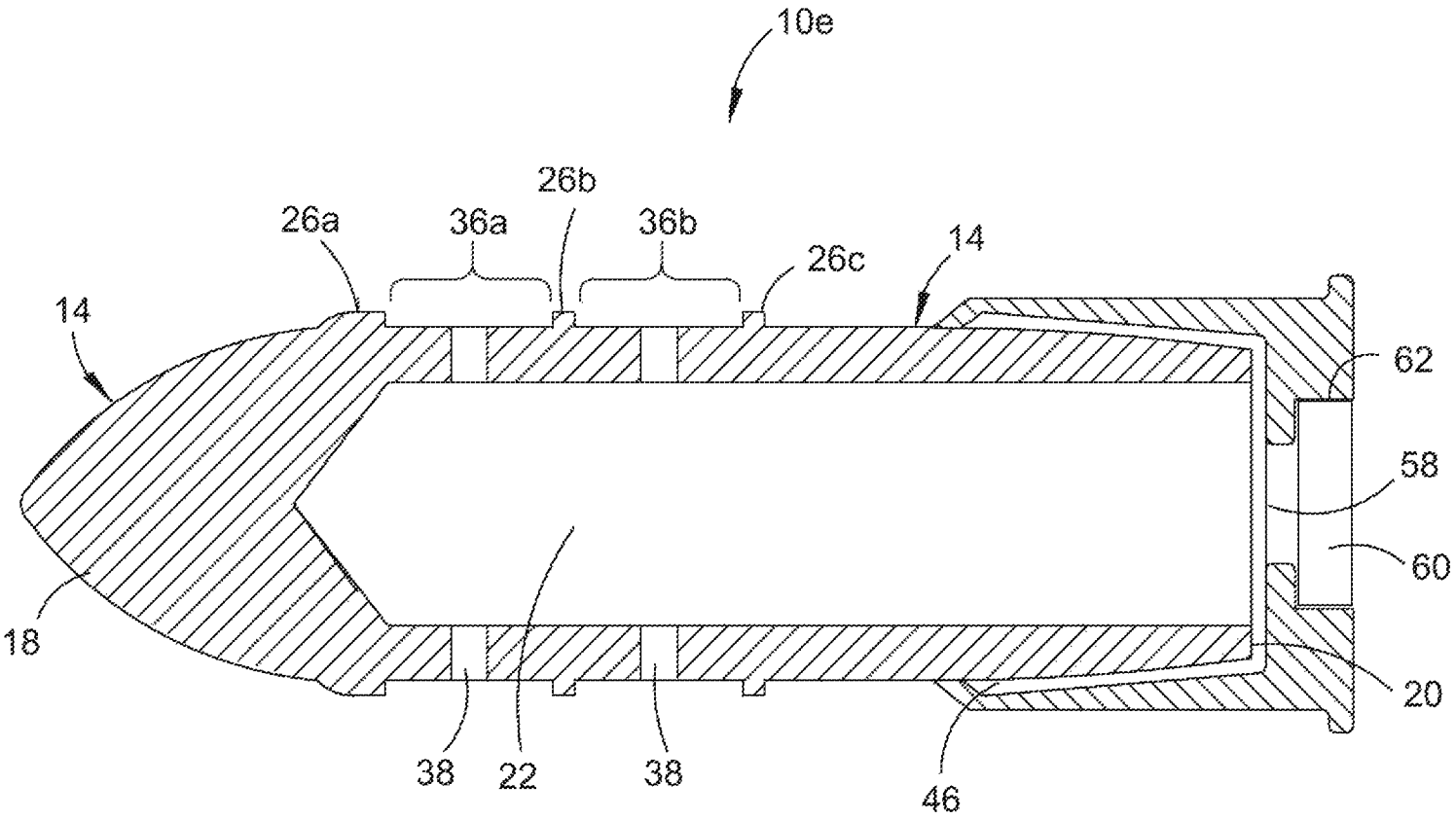
FIG. 9 is a schematic representation of a projectile body for a seventh embodiment of an ammunition round.

FIG. 9 depicts a further embodiment of a round 10e which may be conveniently referred to as a "semi-cased" round. In FIG. 9 the reference numbers used are intended to denote the same features as used in herein before with reference to earlier described embodiments. The round 10e in general terms includes a projectile body 14 similar to the projectile for the round 10c shown in FIG. 7 fitted with a truncated case 50e. The projectile body 14 as per earlier embodiments has a tip or leading end 18 and a second end 20. A cavity 22 extends axially within the body 14 from the end 20 toward the tip 18. Three seals 26a, 26b and 26c are formed on the body 14. The seals are spaced apart in the axial direction with sets of holes 38 between mutually adjacent seals. Thus two seal bound outer surface portions 36 are formed. One between the seals 26a and 26b which have an intervening set of holes 38; and another between the seals 26b and 26c which are also provided with an intervening set of holes 38. A boat tail 46 is formed near a rear end of the projectile body 14 leading to the second end 20. The truncated case 50e acts to at least partially accommodate the boat tail 46 as well as to close off the cavity 22 and second end 20, and accommodate a primer 60. It will be seen that in this embodiment the case 50e does not extend over or cover any of the seals 26. In this embodiment the truncated case 50e in acts to seal the breach in a conventional firearm and contain the contents of the projectile body 14 as well as providing an initiation source for propellant held within the cavity 22. It is envisaged that such embodiments will utilise hole sealing devices of a type as described above in order to retain the propellant within the cavity 22 and provide protection from the external environment.

In each of the variations shown in FIGS. 5-9 the respective projectiles may be further varied to incorporate variations discussed above in relation to the projectiles 10, 10' and 10" described in relation to FIGS. 1-3. This includes for example the reconfiguration of the holes 38 to be inclined as shown for example in FIG. 2. Further, in relation to the round 10c shown in FIG. 7, the holes 38 that provide pressure equalisation to the different seal bound outer surface portions 36a and 36b may be inclined at different angles to each other. Also the sleeve 70 may be incorporated in each of the embodiments depicted in FIGS. 2, 3, 5, 6, 7 and 9. Further in the embodiments of FIGS. 1, 2, 3, 5, 6, 7 and 9 the seal 26a is shown as having a rounded leading face and a right angle trailing face 40. In each embodiment either one or both of the leading face and trailing face of seal 26a can be at a right angle or inclined to the axis 25 or can be curved. Indeed all or any of the seals 26 can have either one or both of their leading and trailing faces configured to be: a right angle or inclined to the axis 25; or curved.

Figure 10:
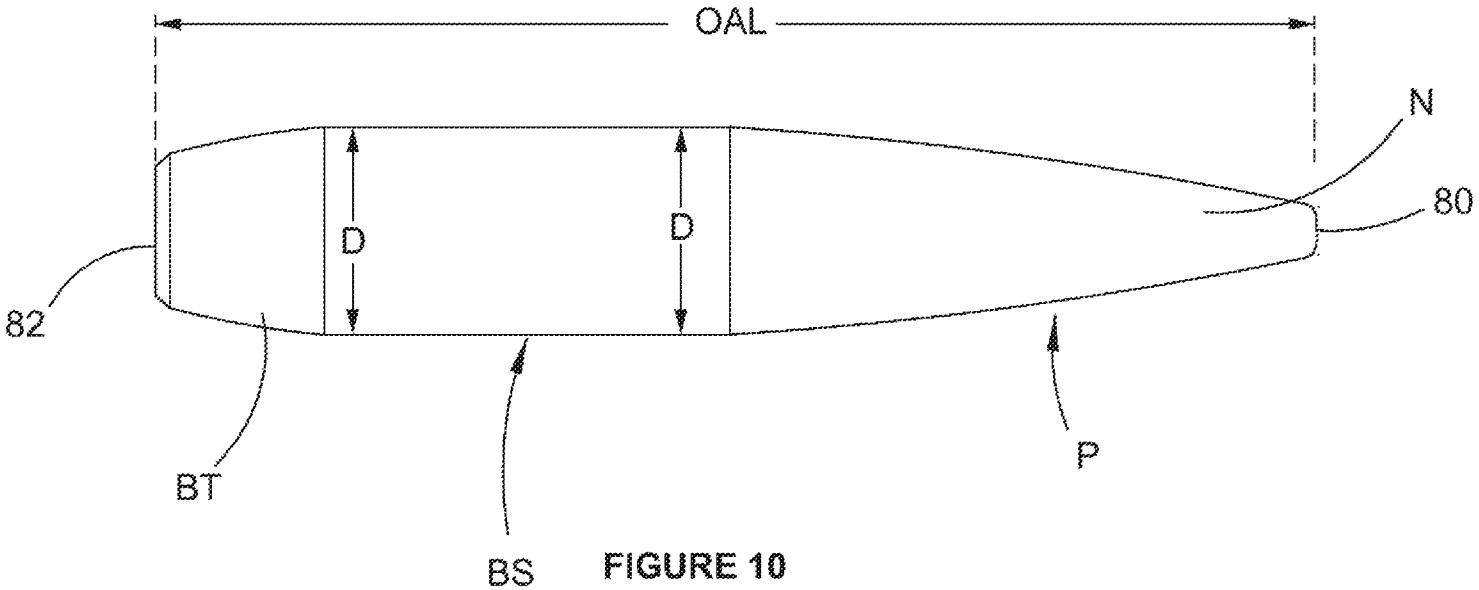
FIG. 10 is a representation of a prior art 7 mm projectile.

FIG. 10 and the tables below provide a comparison between various know prior art projectiles (i.e. bullets) and equivalent calibre embodiments of the present projectile. FIG. 10 depicts a prior art Berger 7 mm 180 grain VLD (very low drag) bullet/projectile P labelled with the dimensional parameters OAL; D; BT; N; and BS. These parameters are explained below:

- OAL—(OverAll Length) is the overall length of a projectile P from its forward most tip 80 to its rearward most surface 82.
- D—(Diameter) is the maximum diameter of the projectile P and corresponds with the calibre. The diameter D is measured at the maximum diameter of the projectile.
- BT—(Boat Tail) is a tapered rearward portion of the projectile P which provides a reduction in outer diameter from the maximum diameter D to the end 82.
- N—(Nose) may be considered as the forward tapered portion of the projectile P from the forward most portion having the diameter D to the tip 80. In most projectiles the nose end is tapered to reduce in diameter in a direction toward the tip 80.
- BS—(Bearing surface) may be considered as the length of the projectile P having the diameter D. In a projectile P without separate radially projecting seals the BS will equate to the length of the projectile P that contacts the rifling of a barrel.

In Table 1 below the heading "7 mm Projectile 10 Variation A" is reference to a 7 mm calibre version of the projectile 10 with an OAL of 2" (2 inches). The heading "7 mm Projectile 10 Variation B" is reference to a 7 mm calibre version of the projectile 10 with an OAL of 3" (3 inches). The increase in OAL in variation B is spread evenly between the length of the boat tail and the bearing surface, each increasing by ½" over the equivalent dimensions of variation A.

A comparison between the Berger 7 mm VLD and both variations A and B indicate that for the same diameter D and length of Nose both variations A and B of the present projectile 10 provide a longer bearing surface and boat tail. The longer bearing surface provides improved stability while the increased length in boat tail assists in reducing dynamic drag.

The column "ratio" in Table 1 is the ratio of the length of the characteristic in question in comparison to the diameter D of the projectile in question. Thus for example OAL/D=5.534; D/D=1; BT/D=0.726 etc. The change in these ratios for variations A and B of the projectile 10 in comparison with the corresponding ratio for the Berger 7 mm projectile as shown in Table 1 as headings Δ % A and Δ % B. For example a comparison between the OAL ratios of variation A of the projectile 10 to the Berger projectile to is 7.257/5.534=131% (OAL Δ % A).

TABLE 1

| | Berger 7 mm VLD - Actual | | 7 mm Projectile 10 Variation A | | 7 mm Projectile 10 Variation B | | | |
|---|---|---|---|---|---|---|---|---|
| | Dimension" | Ratio | Dimension" | Ratio | Dimension" | Ratio | Δ % A | Δ % B |
| OAL | 1.525 | 5.534 | 2 | 7.257 | 3 | 10.886 | 131 | 197 |
| D | 0.275591 | 1.000 | 0.275591 | 1.000 | 0.275591 | 1.000 | 0 | 0 |
| BT | 0.2 | 0.726 | 0.4 | 1.451 | 0.9 | 3.266 | 200 | 450 |
| N | 0.764 | 2.772 | 0.764 | 2.772 | 0.764 | 2.772 | 0 | 0 |
| BS | 0.541 | 1.963 | 0.9 | 3.266 | 1.4 | 5.080 | 166 | 259 |

Table 2 provides a comparison between three known types of 44 magnum bullets with an equivalent calibre embodiment of the projectile 10.

TABLE 2

| | 44 mag 240 gn Keith style - Actual | | 44 mag 240 gn JSWC* - Actual | | 44 mag 180 gn JHP** - Actual | | 44 mag - Projectile 10 | | | | |
|---|---|---|---|---|---|---|---|---|---|---|---|
| | Dimension" | Ratio | Dimension" | Ratio | Dimension" | Ratio | Dimension" | Ratio | Δ % 1 | Δ % 2 | Δ % 3 |
| OAL | 0.741 | 1.727 | 0.729 | 1.699 | 0.555 | 1.294 | 1.5 | 3.497 | 202 | 206 | 270 |
| D | 0.429 | 1.000 | 0.429 | 1.000 | 0.429 | 1.000 | 0.429 | 1.000 | 0 | 0 | 0 |
| BT | 0 | 0.000 | 0 | 0.000 | 0 | 0.000 | 0.429 | 1.000 | 0 | 0 | 0 |
| N | 0.339 | 0.790 | 0.246 | 0.573 | 0.235 | 0.548 | 0.429 | 1.000 | 127 | 175 | 426 |
| BS | 0.402 | 0.937 | 0.483 | 1.126 | 0.320 | 0.746 | 0.642 | 1.497 | 160 | 133 | 201 |

*JSWC is a jacketed semi wad cutter

**JHP is a jacketed hollow point

In Table 2 a comparison between the characteristics of a 44 mag calibre embodiment of projectile 10 with each of the three prior art projectiles is provided in the columns the Δ %1; Δ %2 and Δ %3 respectively.

It should be noted that for both Table 1 and Table 2 the Δ % change while being calculated as a comparison between the respective ratios for a particular characteristic is of course the same a direct comparisons between the characteristics themselves. For example in Table 1 the comparison between the BS lengths of the Berger with projectile 10 variation A is: 0.9/0.541 which as a percentage gives 166%.

For the above comparisons it can be seen that for the same calibre (diameter D) embodiments of the projectile 10 may have an:

OAL increased by up to 270%, or at least in the range of about 130% to 270% inclusive;

BT increased by up to 450%, or at the least the range of about 200% to 450% inclusive;

N increased by up to 426%, or at the least the range of about 127% to 426% inclusive;

BS increased by up to 259%, at the least the range of about 133% to 259% inclusive;

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the round 10.

The invention claimed is:

1. [A projectile body for an] *An* ammunition round for small arms or light [firearm, the projectile body being elongated and] *firearms having a barrel for firing the ammunition round* comprising:

*a projectile body having:* first and second axially opposed ends and a cavity extending between the first end and the second end, the first end being a leading end of the projectile and closed[.]*;*

*a quantity of propellant held in* the cavity [being capable of holding a quantity of propellant for] propelling the projectile body *through the barrel*;

a plurality of seals extending about an outer surface of the body, *the seals being located rearward of the first end and forward of the second end,* each seal protruding radially from the body to form a substantial seal against an inner circumferential surface of the barrel [of a firearm], wherein [two] *a first and a second* of the plurality of seals are mutually adjacent and spaced apart in a direction of a longitudinal axis of the body to form a seal bound outer surface portion of the body; [and]

one or more holes formed in the body enabling fluid communication between the cavity and the seal bound outer surface portion of the body*;*

*a boat tail portion located between an end of the seal bound outer surface portion of the body and the second end, the boat tail being tapered to reduce in outer diameter toward the second end and wherein the boat tail terminates at the second end and the cavity extends through the boat tail; and*

*a tubular case sealed at one end by a base, the case fitted over a portion of the projectile body, and wherein a portion of the case extending across the seal bound outer surface portion is provided with a constant inner diameter; and where a spacing L between outer most points of two axially most spaced apart seals satisfies the relationship L≥D, where D is the diameter of the maximum of diameter of the projectile body*.

2. The [projectile body] *ammunition round* according to claim 1 comprising a plurality of holes wherein the holes are spaced about the longitudinal axis of the body.

3. The [projectile body] *ammunition round* according to claim 1 wherein each of the one or more holes has an outer opening on the seal bound outer surface portion and an inner opening that opens into the cavity and wherein for at least one of the holes the outer opening of that hole is closer to the first end than the inner opening of that hole.

4. The [projectile body] *ammunition round* according to claim 1 wherein[, when the cavity holds] *the* propellant [comprising] *comprises* a plurality of grains of a solid propellant *and* each hole is arranged to have a diameter at least at one point between the cavity and the seal bound outer surface portion that is no greater than about three times an average grain size of *the* propellant.

5. The [projectile body] *ammunition round* according to claim 1 wherein the one or holes are provided with temporary sealing devices.

6. The [projectile body] *ammunition round* according to claim 5 wherein the temporary sealing devices comprise one of (a) a frangible seal, (b) a seal arranged to eject from the holes, or (c) a seal arranged to melt or combust; all by action of deflagration of propellant held in the cavity.

[7. The projectile body according to claim 1 comprising a boat tail portion located between an end of the seal bound outer surface portion of the body and the second end.]

8. The [projectile body] *ammunition round* according to claim 1 wherein, [the] first end terminates with a planar surface perpendicular to the longitudinal axis.

9. The [projectile body] *ammunition round* according to claim 1 wherein, [the] first end terminates in a point being coaxial with the longitudinal axis.

10. The [projectile body] *ammunition round* according to claim 1 comprising, a ballistic soft tip coupled with the first end of the body.

11. The [projectile body] *ammunition round* according to claim 1, wherein the cavity is a single cavity for holding the propellant and has a longitudinal center line co-axial with *a* longitudinal axis of the body.

12. The [projectile body] *ammunition round* according to claim 1 comprising a sleeve disposed in the cavity and wherein the one or more holes extend through the sleeve into the cavity, wherein propellant for propelling the projectile body is held in the sleeve.

[13. The projectile body according to claim 1 wherein a spacing L between outer most points of two axially most spaced apart seals satisfies the relationship $L \geq D$, where D is the diameter of the maximum of diameter of the projectile body.]

[14. An ammunition round comprising:

a projectile body having first and second axially opposed ends and a cavity extending between the first end and the second end, the first end being a leading end of the projectile and closed, the cavity being capable of holding a quantity of propellant for propelling the projectile body;

a plurality of seals extending about an outer surface of the body, each seal protruding radially from the body to form a substantial seal against an inner circumferential surface of the barrel of a firearm, wherein two of the plurality of seals are mutually adjacent and spaced apart in a direction of a longitudinal axis of the body to form a seal bound outer surface portion of the body; and one or more holes formed in the body enabling fluid communication between the cavity and the seal bound outer surface portion of the body;

a quantity of propellant held in the cavity;

a base seal closing the second end to confine the propellant in the cavity; and, a primer supported in the base seal.]

15. An ammunition round *for small arms or light firearms having a barrel for firing the ammunition round* comprising:

a projectile body *having* first and second axially opposed ends and a cavity extending between the first end and the second end, the first end being a leading end of the projectile and closed, the cavity being capable of holding a quantity of propellant for propelling the projectile body;

a plurality of seals extending about an outer surface of the body, each seal protruding radially from the body to form a substantial seal against an inner circumferential surface of the barrel [of a firearm], wherein [two] *a first and a second* of the plurality of seals are mutually adjacent and spaced apart in a direction of a longitudinal axis of the body to form a seal bound outer surface portion of the body, *wherein the first seal is closer to the first end than the second seal, a forward portion of the projectile body extends between the first seal and the first end, and a rearward portion of the projectile body extends between the second seal and the second end*; [and]

one or more holes formed in the body enabling fluid communication between the cavity and the seal bound outer surface portion of the body;

a tubular case sealed at one end by a base, the case fitted over a portion of the projectile body with the base facing the second end of the projectile body and closing the cavity, *wherein the case and the projectile body are relatively dimensioned so that every seal on the projectile lies outside of the case*; and a quantity of propellant retained within the cavity by the case, and wherein the first end of the projectile body protrudes from the case.

[16. The ammunition round according to claim 15 wherein the case and the projectile body are relatively dimensioned so that the case at least partially overlies at least one seal on the projectile body.]

[17. The ammunition round according to claim 15 wherein the case and the projectile body are relatively dimensioned so that every seal on the projectile lies outside of the case.]

18. The ammunition round according to claim 15 wherein the quantity of propellant is such that substantially the entire cavity is filled with the propellant.

19. The ammunition round according to claim 15 wherein the projectile and the case are relatively dimensioned such that a space is formed between the second end of the projectile body and the base of the case and wherein the propellant is retained between an inner surface of the cavity and the base of the case.

20. The ammunition round according to claim 19 wherein the propellant is provided in a volume greater than that of the space so that at least a proportion of the propellant is held in the cavity.

21. The ammunition round according to claim 19 wherein the propellant is provided in a volume to substantially fill the space and the cavity.

*22. The ammunition round according to claim 1 wherein the plurality of seals includes a third seal located between the second seal and the second end.*

*23. The ammunition round according to claim 15 wherein the case has a constant inner diameter between the seal bound outer surface portion of the body.*

*24. The ammunition round according to claim 1 wherein the plurality of seals are arranged to form two seal bound outer surface portions of the body, and wherein the one or more holes formed in the body are arranged to enable fluid communication between the cavity and each of the two seal bound outer surface portions of the body.*

*25. The ammunition round according to claim 1 wherein the case has a circumferential wall that, for a portion adjacent the base, increases in thickness by way of a reduction of its internal diameter in the direction from a front end of the case toward the base to accommodate the boat tail so as to maintain a relatively constant spacing between the outer surface of the body and the internal diameter of the case.*

*26. A projectile body for small arms or light firearms having a barrel for firing the projectile, the projectile comprising:*

*a projectile body having: first and second axially opposed ends and a cavity extending between the first end and the second end, the first end being a leading end of the projectile and closed;*

*the cavity capable of holding a volume of propellant for propelling the projectile body through the barrel;*

*a plurality of seals extending about an outer surface of the body, the seals being located rearward of the first end and forward the second end, each seal protruding radially from the body to form a substantial seal against an inner circumferential surface of the barrel, wherein a first and a second of the plurality of seals are mutually adjacent and spaced apart in a direction of a longitudinal axis of the body to form a seal bound outer surface portion of the body;*

*one or more holes formed in the body enabling fluid communication between the cavity and the seal bound outer surface portion of the body, the holes arranged to remain open after the projectile body is ejected from the barrel; and*

*a boat tail portion located between an end of the seal bound outer surface portion of the body and the second end, the boat tail being tapered to reduce in outer diameter toward the second end and wherein the boat tail terminates at the second end and the cavity extends through the boat tail.*

*27. The projectile body according to claim 26 wherein the projectile body has a length from the first end to the second end, and wherein the length of the projectile body is constant while the projectile travels through the barrel and in the air from the barrel to a target.*

*28. The projectile body according to claim 26 wherein the projectile body does not include a sleeve or tubular portion that is able to move relative to the holes after the projectile is ejected from the barrel.*

* * * * *